US006640643B2

(12) United States Patent
Ishio et al.

(10) Patent No.: US 6,640,643 B2
(45) Date of Patent: Nov. 4, 2003

(54) CAPACITIVE PRESSURE SENSOR WITH MULTIPLE CAPACITIVE PORTIONS

(75) Inventors: Seiichiro Ishio, Kariya (JP); Yasutoshi Suzuki, Okazaki (JP); Keiichi Shimaoka, Aichi-ken (JP); Hirofumi Funabashi, Aichi-ken (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/196,210

(22) Filed: Jul. 17, 2002

(65) Prior Publication Data

US 2003/0015040 A1 Jan. 23, 2003

(30) Foreign Application Priority Data

Jul. 18, 2001 (JP) ........................................ 2001-218217

(51) Int. Cl.[7] .................................................. G01L 9/12
(52) U.S. Cl. ........................................................ 73/718
(58) Field of Search ........................... 73/718, 724, 706; 361/283.1–283.4

(56) References Cited

U.S. PATENT DOCUMENTS

| 4,838,088 A | 6/1989 | Murakami |
| 5,321,989 A | 6/1994 | Zimmer et al. |
| 5,369,544 A | * 11/1994 | Mastrangelo ............ 361/283.4 |
| 6,211,558 B1 | * 4/2001 | Ismail et al. ................ 257/419 |

FOREIGN PATENT DOCUMENTS

| EP | 0 969 694 A2 | 1/2000 |
| JP | 7-26886 | 3/1995 |
| JP | 7-50789 | 5/1995 |
| JP | 9-257618 | 10/1997 |
| JP | 2000-22172 | 1/2000 |
| JP | 2000-214035 | 8/2000 |

* cited by examiner

Primary Examiner—William Oen
(74) Attorney, Agent, or Firm—Posz & Bethards, PLC

(57) ABSTRACT

On a substrate, first and second capacitive portions are formed to have movable diaphragms having different areas for pressure measurement and diagnostic, wherein a communication structure is provided between the cavity spaces of the first and second capacitive portions to equalize the pressure in the first capacitive space to that of the second capacitive space. The different sizes provide different sensitivity for efficient diagnostic. The first and second capacitive portions can be made in one diaphragm, wherein the second capacitive portion is formed around the first capacitive portion. The cavity spaces of the first and second capacitive portions are connected. Moreover, between the first and second capacitive spaces, an insulation portion may be formed in a ring shape to support the diaphragm portion of the first capacitive portion and the diaphragm portion the second capacitive portion with communication portions.

9 Claims, 10 Drawing Sheets

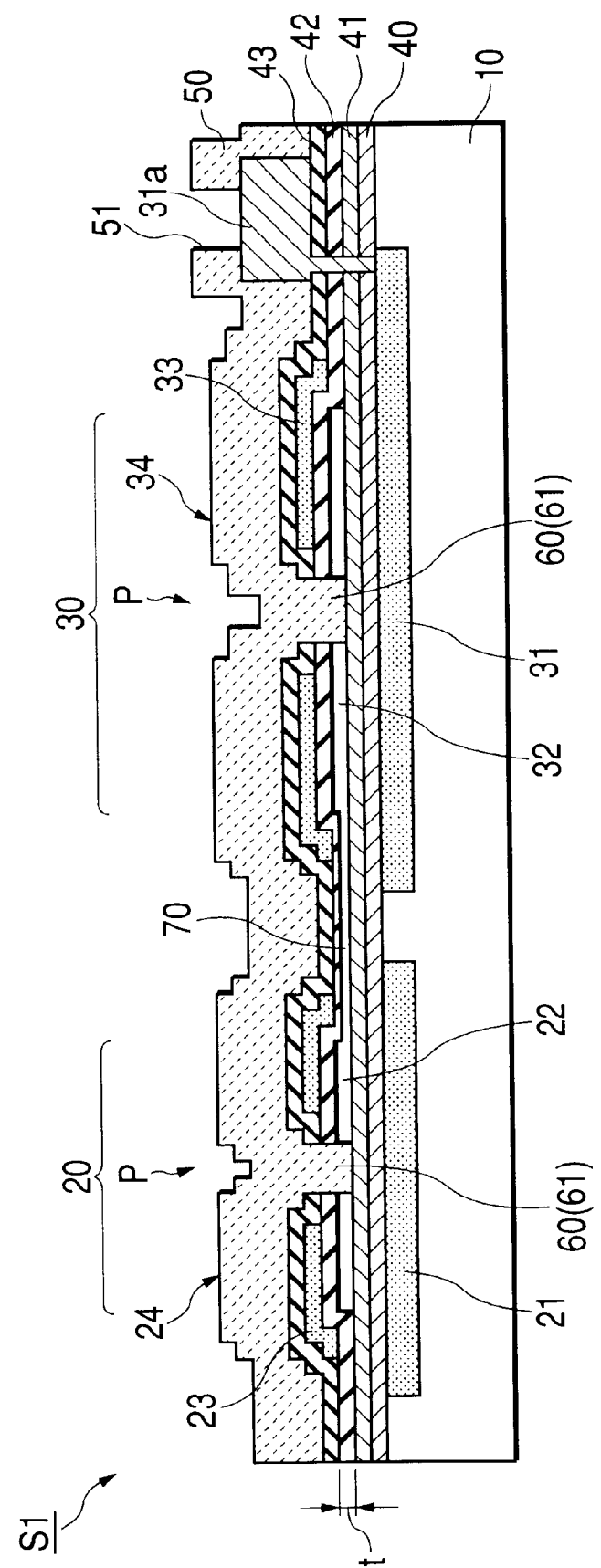

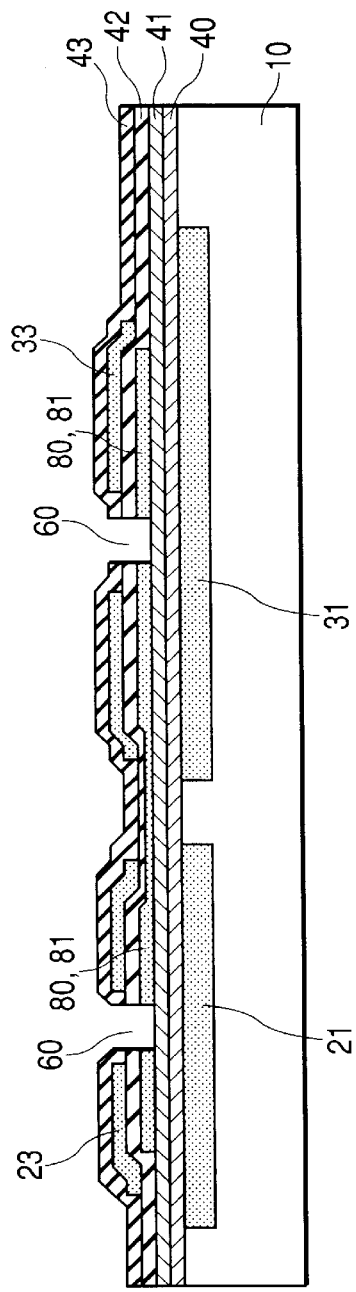
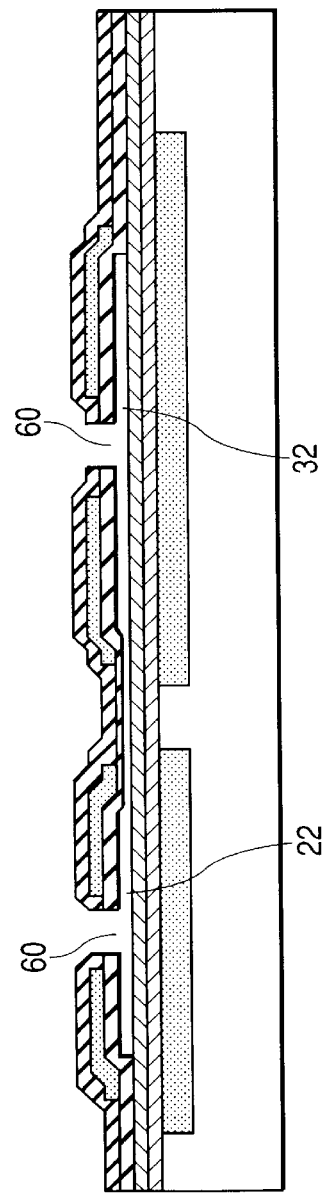

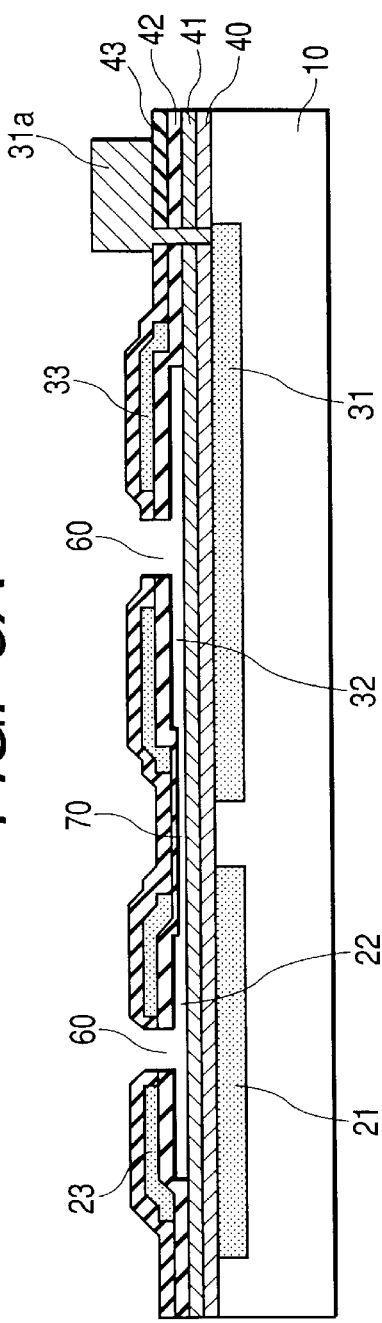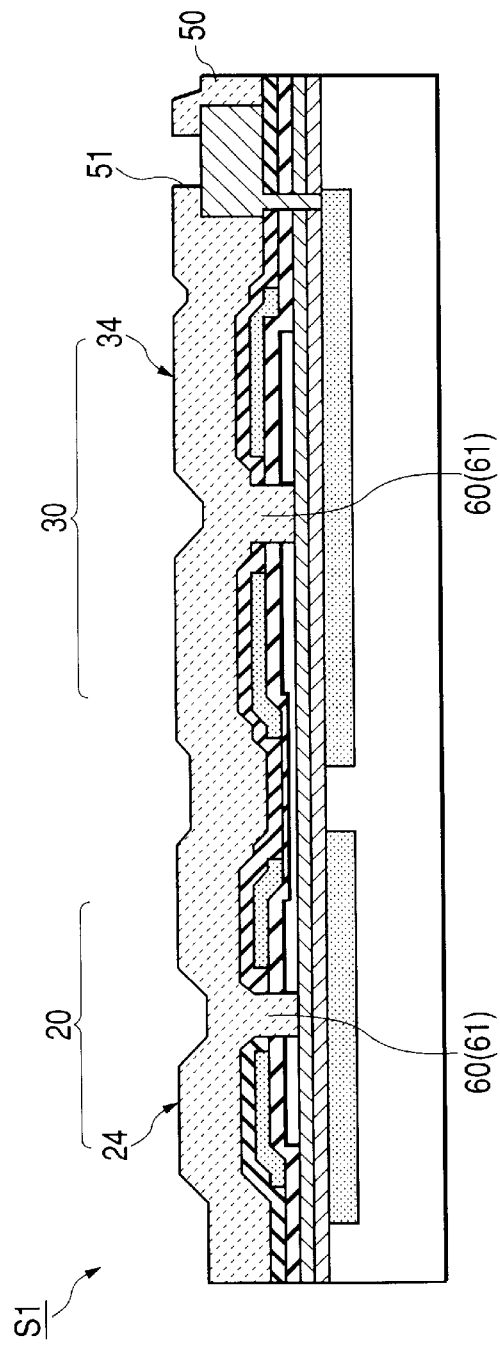

$\Delta C_X$: VARIATION IN CAPACITANCE BETWEEN 1st UPPER & LOWER ELECTRODES $\Delta C_R$: VARIATION IN CAPACITANCE BETWEEN 2nd UPPER & LOWER ELECTRODES $\Delta C_X$: VARIATION IN CAPACITANCE BETWEEN 1st UPPER & LOWER ELECTRODES $\Delta C_R$: VARIATION IN CAPACITANCE BETWEEN 2nd UPPER & LOWER ELECTRODES

US 6,640,643 B2

CAPACITIVE PRESSURE SENSOR WITH MULTIPLE CAPACITIVE PORTIONS

BACKGROUND OF THE INVENTION

1. Field of the Invention

This invention relates to a capacitive pressure sensor including an upper electrode with a diaphragm structure and a lower electrode facing the upper electrode with a gap therebetween for detecting a pressure.

2. Description of the Prior Art

Capacitive pressure sensors having an upper electrode with a diaphragm structure and a lower electrode facing the upper electrode with a gap therebetween for detecting a pressure are known. Japanese patent application provisional publication No. 9-257618 and Japanese patent No. 2000-22172 disclose pressure sensors having the diaphragm structure for detecting a pressure from variation in capacitance between the upper and lower electrodes, wherein the upper electrode is bendable due to the diaphragm structure by the pressure applied thereto. In these pressure sensors, it is desirable to provide a diagnostic operation.

SUMMARY OF THE INVENTION

An object of the present invention is to provide a superior capacitive pressure sensor.

A related object is to provide a superior capacitive pressure sensor with dual pressure sensor structure usable for diagnostic.

According to the present invention, there is provided a capacitive pressure sensor with a dual pressure sensor structure, wherein the pressure in a first cavity space of one pressure sensor between an upper electrode as a diaphragm and a lower electrode, is equalized to the pressure in a second cavity space by a fluid communication structure therebetween.

According to the present invention, a first aspect of the present invention provides a capacitive pressure sensor including: a substrate; a first capacitive portion including a first lower electrode on a surface of the substrate and a first upper electrode facing the first lower electrode with a first cavity space, the first upper electrode being supportable by the substrate to have a first diaphragm structure; a second capacitive portion including a second lower electrode on the surface of the substrate and a second upper electrode facing the second lower electrode with a second cavity space, the second upper electrode being supportable by the substrate to have a second diaphragm structure; and a communicating structure for providing fluid communication between the first and second cavity spaces.

According to the present invention, a second aspect of the present invention provides the capacitive pressure sensor based on the first aspect, further including comparing means for comparing a first value from the first capacitive portion representing a pressure applied thereto with a second value from the second capacitive portion representing the pressure applied thereto to output a diagnostic result.

According to the present invention, a third aspect of the present invention provides the capacitive pressure sensor based on the first aspect, wherein the first capacitive portion has a first layer structure with the first upper and lower electrodes in a sectional elevation view of the capacitive pressure sensor perpendicular to the surface of the substrate, and the second capacitive portion has a second layer structure with the second upper and lower electrodes in the sectional elevation view, and the first layer structure is substantially the same as the second layer structure, and wherein the first and second upper electrodes have first and second areas in parallel to the surface of the substrate, respectively, and the first area is different from the second area.

According to the present invention, a fourth aspect of the present invention provides the capacitive pressure sensor based on the first aspect, wherein the second capacitive portion is arranged to surround the first capacitive portion, the first upper electrode, at an outer circumference, is connected to the second upper electrode at an inner circumference, and the first cavity space is connected to the second cavity space.

According to the present invention, a fifth aspect of the present invention provides the capacitive pressure sensor based on the fourth aspect, further includes a supporting member between the first and second upper electrodes to support the outer circumference of the first upper electrode and the inner circumference of the second upper electrode and also to suppress position variation of the second upper electrode. The communication structure is formed in said the supporting member.

BRIEF DESCRIPTION OF THE DRAWINGS

The object and features of the present invention will become more readily apparent from the following detailed description taken in conjunction with the accompanying drawings in which:

FIG. 2 is a sectional elevation view of the capacitive pressure sensor, taken on line A—A in FIG. 1A;

FIGS. 4A and 4B are sectional elevation views of another processes of the capacitive pressure sensor according to the first embodiment, taken on line A—A in FIG. 1A FIGS. 5A and 5B are sectional elevation views of still another processes of the capacitive pressure sensor according to the first embodiment, taken on line A—A in FIG. 1A;

The same or corresponding elements or parts are designated with like references throughout the drawings.

DETAILED DESCRIPTION OF THE INVENTION

Figure 13:
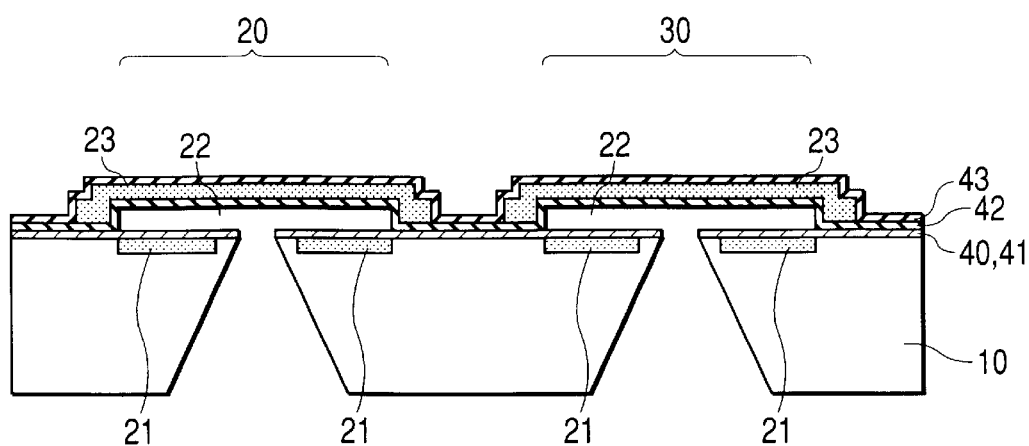
FIG. 13 is a sectional elevation view of a proto-type of capacitive pressure sensor according to this invention.

FIG. 13 shows a proto-type of capacitive pressure sensor with dual sensor structure proposed by the same inventors of this application.

FIG. 13 shows, in a sectional elevation view, a capacitive pressure sensor has a first capacitive portion 20 including an upper electrode 23 with a diaphragm structure and a lower electrode 21 facing the upper electrode 23 with a cavity space (gap) 22 for detecting a pressure and a second capacitive portion 30 having the same structure on a substrate 10. Compression between variations in capacitances of respective sensors provides diagnostic of the sensors. However, it is further required to provide a communication structure between the cavity spaces of the first and second sensors to equalize the pressures at the spaces 22 to each other.

First Embodiment

Figure 1A:
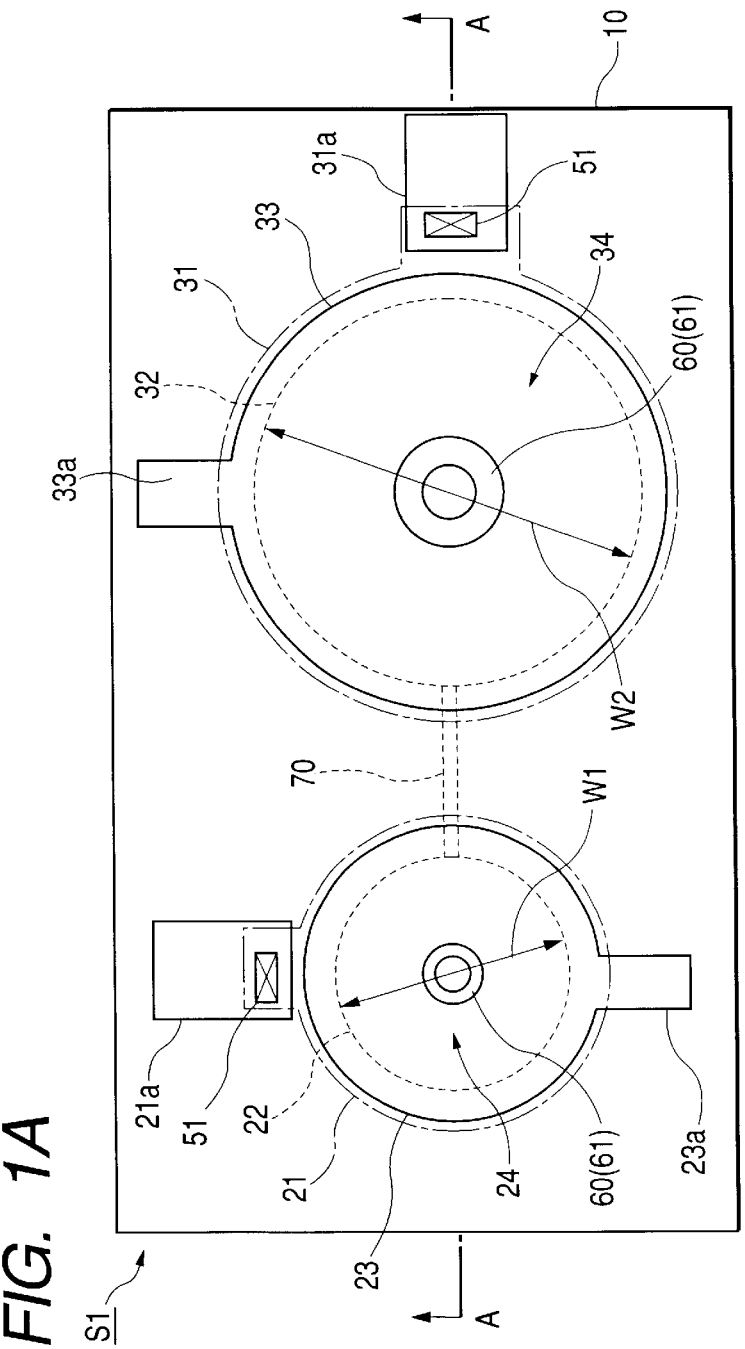
FIG. 1A is a plan view of a capacitive pressure sensor according to a first embodiment.

FIG. 1A is a plan view of a capacitive pressure sensor S1 with the dual sensor structure and FIG. 2 is a sectional elevation view of the capacitive pressure sensor taken on the line A—A in FIG. 1A. In the plan views in this specification, contours of electrodes are represented with various kinds of lines to clearly show the electrodes.

This capacitive pressure sensor S1 is provided mainly for measuring an absolute pressure.

The pressure sensor S1 comprises a p-type of single crystal silicon substrate 10 is formed to have a (100) plane. On a surface of the substrate 10, first and second capacitive portions 20 and 30 are formed. The first capacitive portion 20 includes a first lower electrode 21, a first upper electrode 23 with a diaphragm structure above the first lower electrode 21 with a cavity space 22. The second capacitive portion 30 includes a second lower electrode 31, a second upper electrode 33 with a diaphragm structure above the second lower electrode 31 with a cavity space 32.

The first and second lower electrodes 21 and 31 are made of an electroconductive material. More specifically, in this embodiment, the first and second lower electrodes 21 and 31 comprise diffused layers (n-type diffused layers) in a surface of the substrate 10 in forms of substantially circle films as shown in FIG. 1A.

On the surface of the substrate 10 and the surfaces of the lower electrodes 21 and 31, there are formed first insulation films 40 and 41 to cover the first and second lower electrodes 21 and 31 for electric insulation. In this embodiment, the first insulation films 40 and 41 comprise a silicon oxide film ($SiO_2$ film) and a silicon nitride film (SiN film) 41 covering the $SiO_2$ film 40, respectively.

On the first insulation films 40 and 41, a second insulation film 42 is formed. In this embodiment, the second insulation layer 42 comprises a silicon nitride film. Above the first and second lower electrodes 21 and 31, the second insulation film 42 has swelled portions to provide the cavity spaces 22 and 32, respectively. Above the first and second lower electrodes 21 and 31 and on the swelled portion, there are formed first and second upper electrodes 23 and 33 made of conductive materials on the insulation film 42. In this embodiment, first and second upper electrodes 23 and 33 comprise polycrystal silicon (Poly-Si) having diaphragm structures as shown by solid lines in FIG. 1A, respectively.

On the upper electrodes 23 and 33 and on the second insulation film 42 where the upper electrodes 23 and 33 are not formed, a third insulation film 43 is formed. In this example, the third insulation film 43 comprises a silicon nitride film or the like. The first to third insulation films 40 to 43 electrically insulating the upper electrodes 23 and 33 and lower electrodes 21 and 31 from each other.

Moreover, at desired positions on the top surface of the capacitive sensor S1, there are formed electrode pads 21a, 23a, 31a, and 33a for connection of respective electrodes 21, 23, 31, and 32. More specifically, as shown in FIG. 2, the lower electrode pad 31a for connection of the lower electrode 31 is electrically connected to the lower electrode 31 at a portion extending from the circle portion of the lower electrode through via holes of the first to third insulation layers 40 to 43. Similarly, the lower electrode pad 21a on the top surface of the capacitive sensor S1 is electrically connected to the lower electrode 21.

Moreover, upper electrode pads 23a and 33a for connection of the upper electrodes 23 and 33 are formed on the third insulation film 43 and electrically connected to portions extended from the circle portions of upper electrodes 23 and 33. Respective electrode pads are made of a conductive material such as Al, Al—Si or the like.

On the third insulation film 43 and the electrode pads 21a, 23a, 31a, and 33a, a protection film 50 is formed as a silicon nitride film to cover them. However, above the respective electrode pads 21a, 23a, 31a, and 33a, the protection film 50 is partially removed to form openings 51 to provide connection of respective electrode pads through the openings 51.

At predetermined regions of the cavity spaces 22 and 32 in the first and second capacitive portions 20 and 30 (in this example, the center portions of the cavity spaces 22 and 32 having substantially circular forms), through holes 60 piercing through the second insulation film 42, the upper electrodes 23 and 33, and third insulation film 43 are formed to communicate with the space above the third insulation film 43 and with the cavity spaces 22 and 32, respectively. Then, the through holes 60 are filled with the protection film 50, so that the protection film 50 extends to and contact with the upper surface of the insulation film 41 through the through holes 60.

Thus, filling the protection film 50 in the through holes 60 forms sealing portions 61, so that the cavity spaces 22 and 23 are sealed to provide a predetermined inner pressures to act as reference pressure chambers (in this example, a vacuum pressure which can be provided with a vacuum device).

As mentioned above, there are provided the first capacitive portion 20 having the first lower electrode 21, the first upper electrode 23 facing the first lower electrode 21 spaced with the first cavity space 22 to have the diaphragm structure and the second capacitive portion 30 having the second lower electrode 31, the second upper electrode 33 facing the second lower electrode 31 spaced with the second cavity space 32 to have the diaphragm structure.

Thus, at the first and second capacitive portions 20 and 30, structures including the second insulation film 42, upper electrodes 23 and 33, the third insulation film 43, and the protection film 50 provide diaphragms 24 and 34, respectively, which can be bent by the pressure downwardly applied to thereto (in FIG. 2).

The capacitive pressure sensor S1 has a communication structure (channel) 70 to provide fluidic communication between the first and second cavity spaces 22 and 32 to equalize the inner pressure in the cavity space 22 to that in the cavity space 32.

The communication structure is provided as a channel between the first insulation film 41 and the second insulation film 42. The width of the channel is considerably smaller than the diameters W1 and W2 of the cavity spaces 22 and 32 to prevent the bending characteristics of the movable diaphragms 24 and 34 from changing.

The capacitive pressure sensor S1 has a common structure between the first and second capacitive portions 20 and 30 in the sectional elevation view, each having the lower electrode 21 or 31, the first insulation layer 40 and 41, the cavity space 22 or 32, the second insulation film 42, the upper electrode 23 or 33, the third insulation film 43, and the protection film 50. In other words, both capacitive portions 20 and 30 have the same layer structure or the same elevation sectional structure.

However, the first upper electrode 23 and the second upper electrode 33 have different plane areas in parallel to the surface of the substrate 10. In this example, the second upper electrode 33 has a larger area (except the sectional area of the seal 61) than the first upper electrode 23.

More specifically, the diaphragm 24 of the first capacitive portion 20 has the diameter W1 of ϕ20 μm, and the diaphragm 34 of the second capacitive portion 30 has a diameter W2 of ϕ200 μm (FIG. 1A). The cavity gaps t of the cavity spaces 22 and 32 is 0.1 μm (FIG. 2).

FIGS. 3A to 3C, 4A and 4B, 5A and 5B show the process of producing the capacitive pressure sensor S1.

Figure 3A:
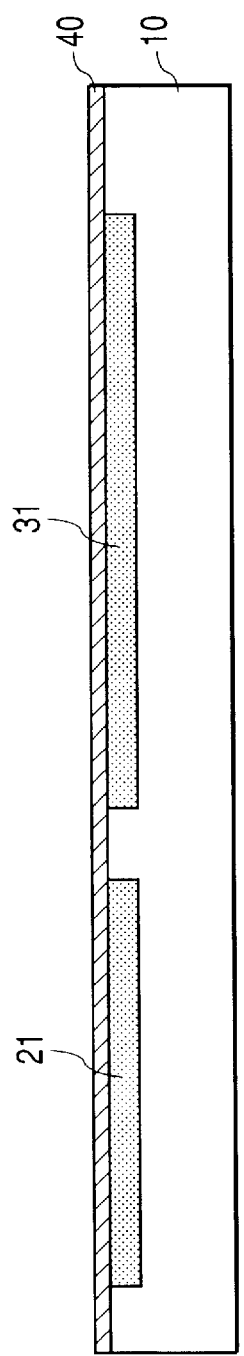
FIGS. 3A to 3C are sectional elevation views of processes of the capacitive pressure sensor according to the first embodiment, taken on line A—A in FIG. 1A.

Process Shown in FIG. 3A

On a top surface (in FIG. 3A) of the substrate 10 of p-type silicon substrate having a (100) plane, a $SiO_2$ film 40 for ion injection is formed by means of thermal oxidation. On the surface of the $SiO_2$ film 40, mask patterns (not shown) corresponding to the lower electrodes 21 and 31 are formed with resist. Next, the lower electrodes 21 and 31 of + diffusion layers are formed by means of ion injection (lower electrode forming process).

Figure 3B:
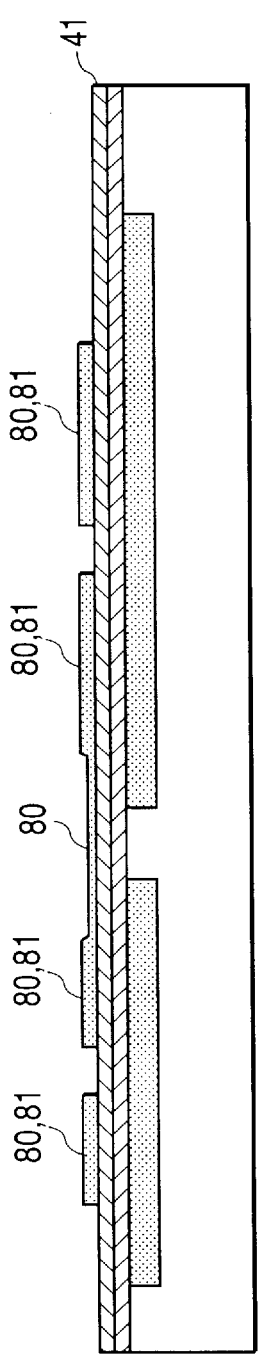

Process Shown in FIG. 3B

Next, a first SiN film 41 is formed to cover the surface of the substrate 10 by means of CVD method or the like. Then, the first insulation films 40 ($SiO_2$) and 41 (SiN) are formed (first insulation film forming process).

On the first insulation film 41, sacrifice layers 80 of polycrystal silicon are formed at corresponding positions of the cavity spaces 22 and 32 and the communication channel 70 by means of the CVD method or the like. Further, sacrifice layers 81 of polycrystalline silicon are formed on the sacrifice layers 80 corresponding to the cavity spaces 22 and 32 (sacrifice layer forming process). Thus, the thickness of the sacrifice layers 80 and 81 for the cavity spaces 22 and 32 is larger than the thickness of the sacrifice layer 80 for the communication channel 70.

Figure 3C:
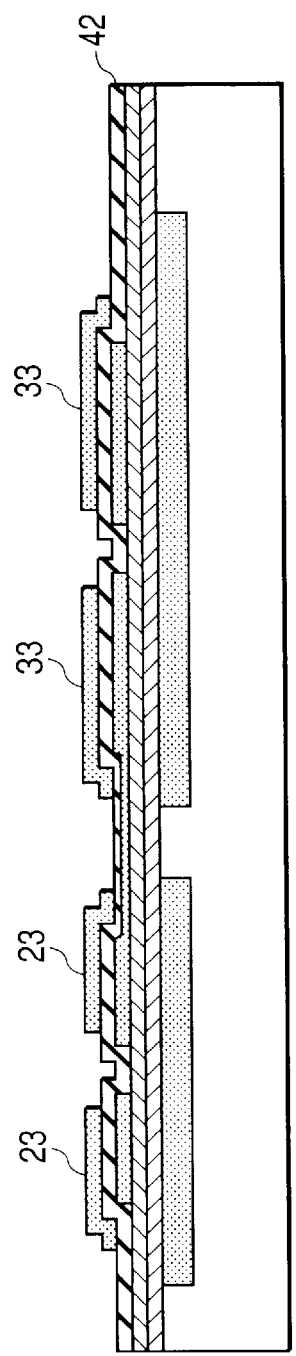

Process Shown in FIG. 3C

Next, on the sacrifice layers 80 and 81 and the first insulation film 41, the second insulation film 42 of SiN is formed as the second insulation film (second insulation film forming process). Next, on the entire top surface of the work provided by the second insulation film forming process, a polycrystalline silicon film is formed by means of the CVD method or the like, and then, the polycrystalline silicon film is patterned in the forms of the upper electrodes 23 and 33 to provide the upper electrodes 23 and 33 (upper electrode forming process).

Process Shown in FIG. 4A

Next, on the entire top surface of the work provided by the upper electrode forming process, a third SiN film 43 is formed by means of the CVD method or the like as the third insulation film 43 (third insulation film forming process).

Next, at the positions corresponding to the through holes 60, reactive ion etching (RIE) or the like is made on the third SiN film 43 to partially remove the third SiN film 43 and the second SiN film 42, and the sacrifice layers 80 and 81 to form the through holes 60 reaching the first insulation film 41 (through hole forming process).

Process Shown in FIG. 4B

An alkalinity etchant such as TMAH (ttramethlammonium hydroxide) or an etching gas such as $XeF_6$ is injected into the through holes 60 to remove the remaining sacrifice layers 80 and 81 (sacrifice layer etching process). This process forms the cavity spaces 22 and 32 and the communication channel 70.

Process Shown in FIG. 5A

Next, predetermined portions of the first to third insulation films 40 to 43 are removed by means of RIE or the like to form openings for electrically connecting the lower electrodes 21 and 31 to the lower electrode pads 21a and 31a. Next, the lower electrode pads 21a and 23a and the upper electrode pads 31a and 33a are formed by means of deposition with Al-Si (electrode pad forming process).

Process Shown in FIG. 5B

Next, the entire top surface of the work after the electrode pad forming process, the protection film 50 of SiN is formed by means of CVD method or like (protection film forming process). This seals the through holes 60 with the sealing portions 61 to provide the reference pressure chambers. Here, the work is put into a vacuumed chamber, and this process is done under a vacuum pressure to provide the reference pressure chambers (cavity spaces 22 and 32). Thus, the cavity spaces 22 and 32, and the communication channel have fluidic sealing with walls of the first insulations film (SiN film) 41, the second insulation 42, and the sealing portions 61.

Next, the portions of the protection film 50 on the respective electrodes pads are removed by means of etching such as RIE to form the openings 51 for connecting respective electrode pads to the external. Then, the capacitive pressure sensor S1 is provided.

Operation

In this embodiment, the first capacitive portion 20 having a smaller size of the diaphragm is used for pressure measurement, and the second capacitive portion 30 with a larger size of the diaphragm is used for diagnostic. This is because the capacitive portion having a larger size of diaphragm tends to be damaged or deteriorated, that is, it is more damageable.

Since the sizes (areas) of the movable diaphragm 24 and 34 are different from each other, they have different stiffness, that is, different sensitivities in pressure. If a pressure is applied to both movable diaphragms 24 and 34, the movable diaphragm 24, i.e., the first upper electrode 23 bends. The magnitude of pressure can be obtained on the basis of the variation in capacitance (first capacitance) between the first lower electrode 21 and the first upper electrode 23 caused by the application of the pressure.

Figure 1B:
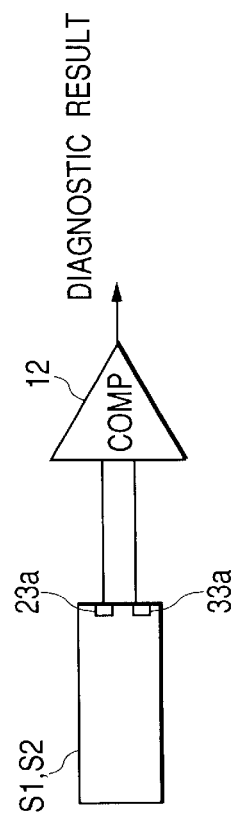
FIG. 1B is a block diagram of a capacitive pressure sensor with a comparing circuit according to this invention.

The comparing circuit 12 compares the measured value regarding the first capacitance with the measured value regarding the second capacitance between the second lower electrode 31 and the second upper electrode 33 to provide a diagnostic operation as shown in FIG. 1B.

For example, if the same pressure is applied to movable diaphragms 24 and 34, and the same voltage or a frequency signal is applied to the lower electrodes 21 and 31 and the upper electrodes 23 and 33, respectively, then the measured first and second capacitances are different from each other in accordance with the applied pressure and the applied voltage because the sensitivities are different from each other. Moreover, the degrees of variation in capacitance are also different from each other.

Thus, comparison such as obtaining difference between the variation in the first capacitance $\Delta C1$ and the variation in the second capacitance $\Delta C2$, i.e., $(\Delta C1-\Delta C2)$, comparing between the first and second capacitances, and comparing voltages derived from the capacitances or variations in capacitance provides diagnostic. That is, if one of the capacitive portions 20 and 30 has a trouble, comparison of the value based on the capacitance of one capacitive portion with that of the other capacitive portion provides detection of the trouble.

For example, the variation of the first capacitance $\Delta C1$ is proportional to $(W^4/t^3) \times \Delta P$, where W represents the area of the movable diaphragm, t represents the gap of the cavity space, and $\Delta P$ represents variation in the applied pressure. Then, as mentioned above, in the example where the diameter W1 of the movable diaphragm 24 in the first capacitive portion 20 is $\phi 20$ $\mu$m, the diameter W2 of the movable diaphragm 34 in the second capacitive portion 30 is $\phi 200$ $\mu$m, the gap t of the cavity spaces 22 and 32 is 0.1 $\mu$m, a difference in capacitance between the capacitive portions 20 and 30 corresponds to a pressure difference of about $4 \times 10^2$ Pa which is usable for diagnostic.

As described above, this embodiment provides the diagnostic operation for detecting a trouble or a detecting operation of operational condition of the sensor. Moreover the pressure at the first cavity space 22 can be equalized to that in the second cavity 32 through the communication channel 70.

This embodiment is applicable to the example shown in FIG. 13. That is, openings are provided in the bottom surface of the substrate 10 (in FIG. 2) to introduce a pressure into the cavity spaces 22 and 32 to measure the difference pressure between the top and bottom surfaces of the substrate 10. In this case, either of openings to introducing the pressure into the cavity spaces can be omitted. The pressure is introduced through the communication channel 70 to the cavity space 22 of the capacitive portion of which opening was omitted. Thus, at least one of the first and second capacitive portions 20 and 30 has fluidic sealing inside of the cavity space thereof except a connecting portion between the communication structure and the cavity space.

As mentioned above, both capacitive portions 20 and 30 have the same sectional elevation structure (layer structure), but the areas of the first and second upper electrodes 23 and 33 are different from each other, so that the stiffnesses (sensitivity) of the diaphragms can be made different.

Moreover, since the sectional elevation structures of both capacitive portions 20 and 30 are the same, both capacitive portions 20 and 30 can be produced through the same production processes, wherein mask patterns with different areas for diaphragms provides the difference in areas of the diaphragms. Thus, according to this embodiment, diaphragms having different stiffnesses can be easily provided.

Second Embodiment

The second embodiment provides a pressure sensor mainly used for measuring a relative pressure difference with a compact size and diagnostic function.

Figure 6:
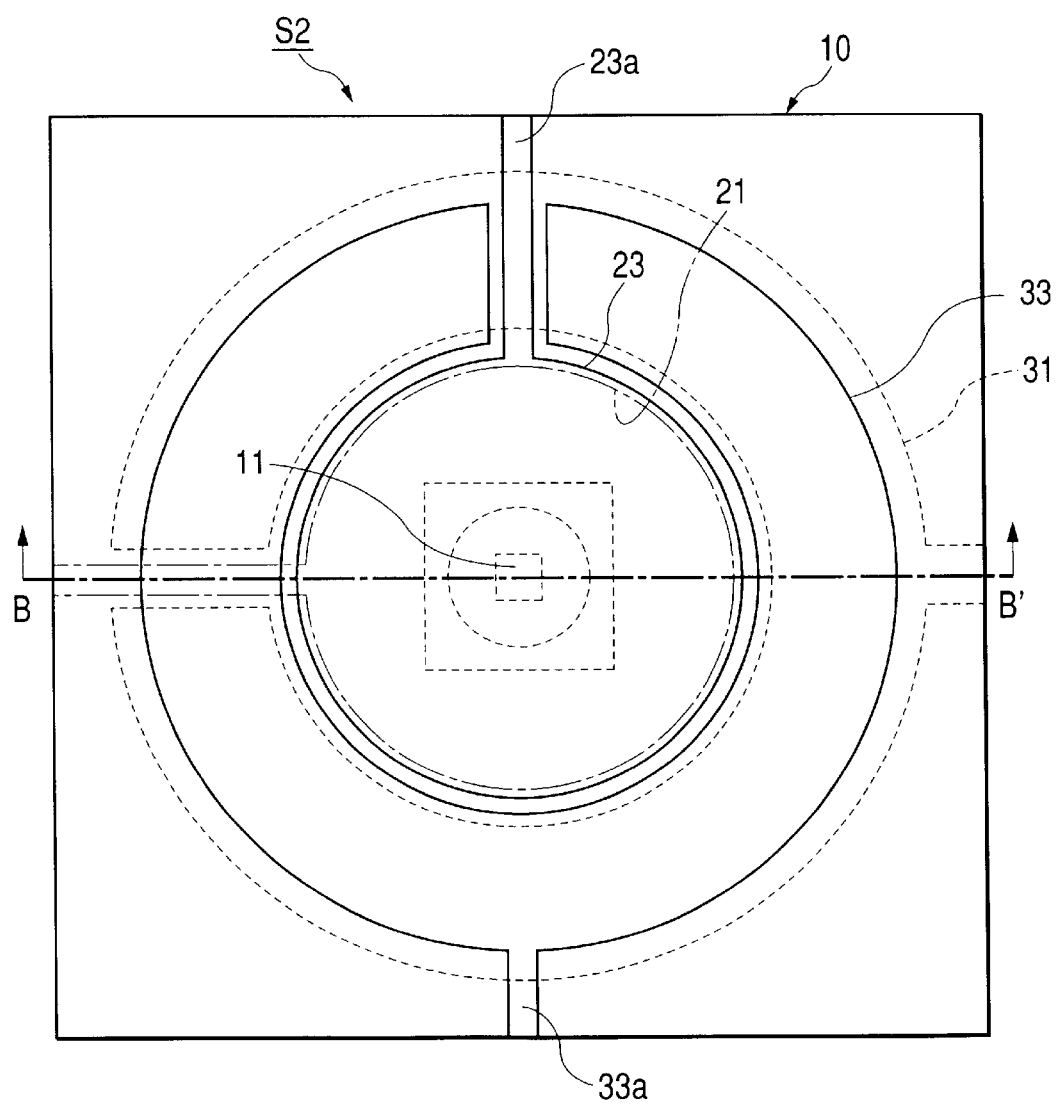
FIG. 6 is a plan view of a capacitive pressure sensor according to a first example of a second embodiment.
Figure 7:
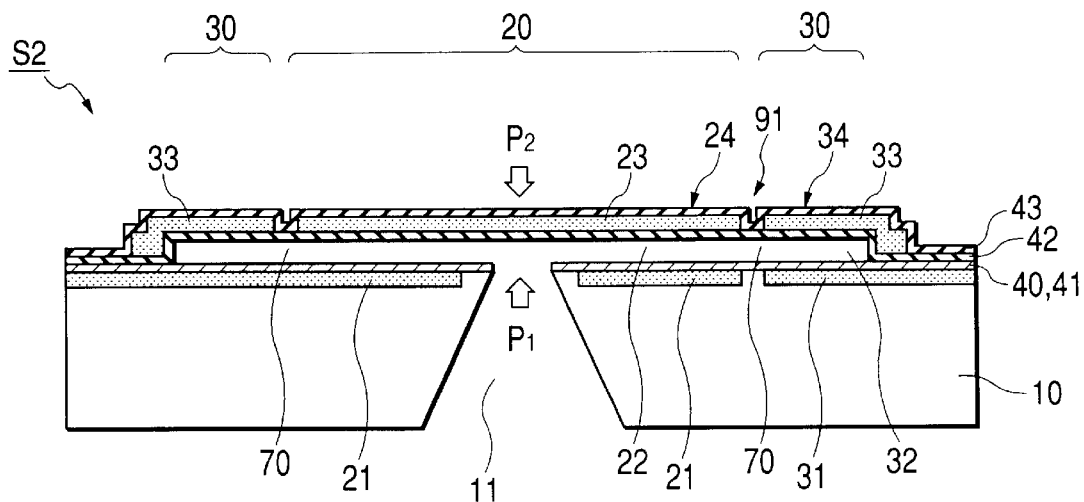
FIG. 7 is a sectional elevation view of the capacitive pressure sensor, taken on line B–B' in FIG. 6.

FIG. 6 shows a capacitive pressure sensor S2 of a first example according to the second embodiment in a plan view. FIG. 7 shows a sectional elevation view of this capacitive pressure sensor S2, taken on line B—B in FIG. 6. In FIG. 6, the first lower electrode 21 is shown by dashed lines, and the second lower electrode 31 and an opening 11 are shown by chain lines.

In this embodiment, the second capacitive portion 30 is so arranged as to surround the circumference of the first capacitive portion 20. More specifically, the second upper electrode 33 (shown by solid lines in FIG. 6) having a diaphragm structure in a form of a circular ring is provided as a peripheral portion of the first upper electrode 23 (shown by solid lines in FIG. 6) having a circular diaphragm structure. In this embodiment the protection film 50 and the electrode pads are not shown. Moreover, the protection film 50 can be omitted in this embodiment.

As shown in FIG. 7, the first and second upper electrodes 23 and 33 are sandwiched between the second insulation film 42 and the third insulation film 43, wherein between the outer circumference of the first upper electrode 23 and the inner circumference of the second upper electrode 33, there is an insulation portion 91 where the second insulation film 42 contacts with the third insulation film 43 to insulate the first upper electrode 23 from the second upper electrode 33.

Therefore, the movable diaphragm 24 of the first capacitive portion 20 and the movable diaphragm 34 of the second capacitive portion 30 are formed in one diaphragm with electrical insulation. In other words, the first and second capacitive portions 20 and 30 are arranged at the center and the peripheral portion of the one diaphragm, respectively.

Under the first upper electrode 23, the first lower electrode 21 (shown in by dashed lines in FIG. 6) in a form of a circular ring facing the first upper electrode 23 with the first cavity space (gap) 22. Under the second upper electrode 33, the second lower electrode 31 (shown in by chain lines in FIG. 6) is formed to have a form of a circular ring facing the second upper electrode 33 with the second cavity space (gap) 32. Thus, the second lower electrode 31 surrounds the outer circumference of the first lower electrode 21.

Here, the first cavity space 22 connects with the second cavity space 32, so that they form one space substantially. Thus, the space under the insulation portion 91 between the outer circumference of the first upper electrode 23 and the inner circumference of the second upper electrode 33 acts as the communication structure 70.

On the bottom surface of the substrate 10 (in FIG. 7), the opening portion 11 for introducing the pressure $P_1$ into the first and second cavity spaces 22 and 32 is formed. Because of the communication structure 70, the same pressure P1 pressures the first and second cavity spaces 22 and 32.

Since the flexibilities at the center and peripheral portions of the one diaphragm are different from each other, which makes the sensitivities (stiffnesses) of the movable diaphragms 24 and 34 different.

Operation

The capacitive pressure sensor S2 of this example operates as follows:

Here, it is assumed that the first and second capacitive portions 20 and 30 are used for measuring the subject pressure and for diagnostic, respectively.

As shown in FIG. 7, when the pressure P1 and the pressure P2 are applied to the one diaphragm from the bottom and top surfaces of the capacitive sensor S2, respectively, the movable diaphragm 24, that is, the first upper electrode 23 bents and are displaced from its rest position (no difference in pressures), so that the capacitance between the first lower electrode 21 and the first upper electrode 23 (first capacitance) varies. Thus, the pressure difference (P1–P2) can be obtained.

Moreover, because there is difference in flexibility between the center portion and the peripheral portion of the one diaphragm, diagnostic can be provided by comparing the value based on the first capacitance with the value based on the second capacitance between the second lower electrode 31 and the second upper electrode 33 of the second capacitive portion 30 with the comparing circuit 12.

Figure 8:
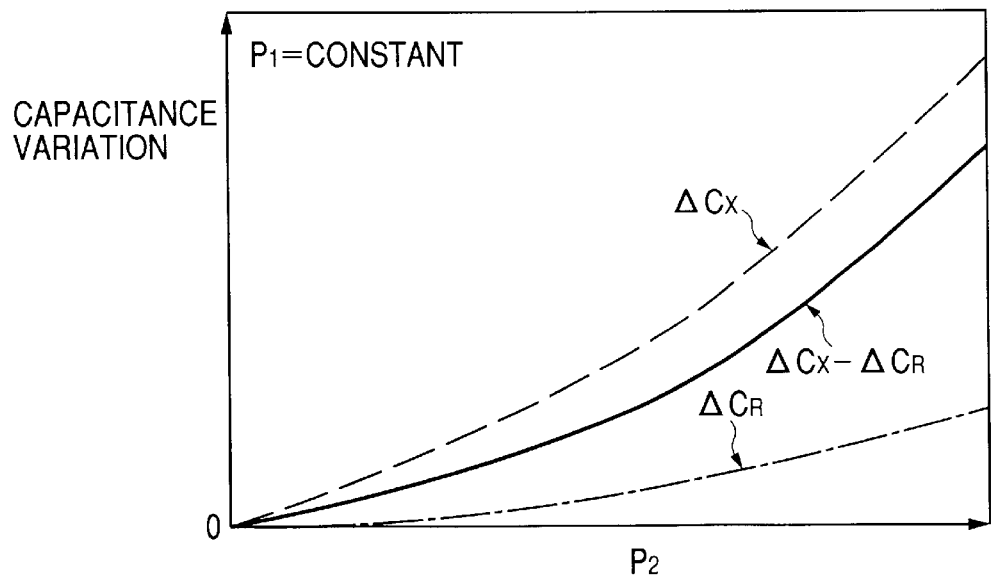
FIG. 8 is a graphical drawing illustrating a relation between the capacitance variation and the pressure in the first example of a second embodiment.

Referring now to FIG. 8, the pressure measurement and diagnostic will be described more specifically. FIG. 8 shows relations between capacitance variation and the pressure $P_2$. Here, it is assumed that the value based on the first capacitance is a first capacitance variation $\Delta C_x$, and the value based on the second capacitance is a second capacitance variation $\Delta C_R$, and the difference between the first and second capacitance variations is ($\Delta C_x - \Delta C_R$). Moreover, in FIG. 8, the pressure $P_1$ applied to the top surface (in FIG. 8) of the capacitive pressure sensor S2 is constant, but the pressure $P_2$ applied to the bottom surface of the capacitive pressure sensor S2 is varied, whereupon the first capacitance variation $\Delta C_x$, the second capacitance variation $\Delta C_R$, and the difference ($\Delta C_x - \Delta C_R$) are shown.

As shown in FIG. 8, the difference in pressure (P1–P2) can be obtained from the first capacitance variation $\Delta C_x$. If either of the first or second capacitive portion has a trouble (deterioration, damage, or the like), the difference ($\Delta C_x - \Delta C_R$) will deviate from the reference characteristic of the difference ($\Delta C_x - \Delta C_R$) shown in FIG. 8. This provides detection of the trouble.

As mentioned above, the first example according to this embodiment provides, the capacitive pressure sensor S2 with diagnostic operation with miniaturization in the same way as the first embodiment. Further, the first and second capacitive portions 20 and 30 can be formed in the one diaphragm, so that the miniaturization is further provided.

Moreover, the first and second capacitive portions 20 and 30 are adjacently formed with the one diaphragm, so that the temperature dependencies of the first and second capacitive portions 20 and 30 can be equalized.

Figure 9:
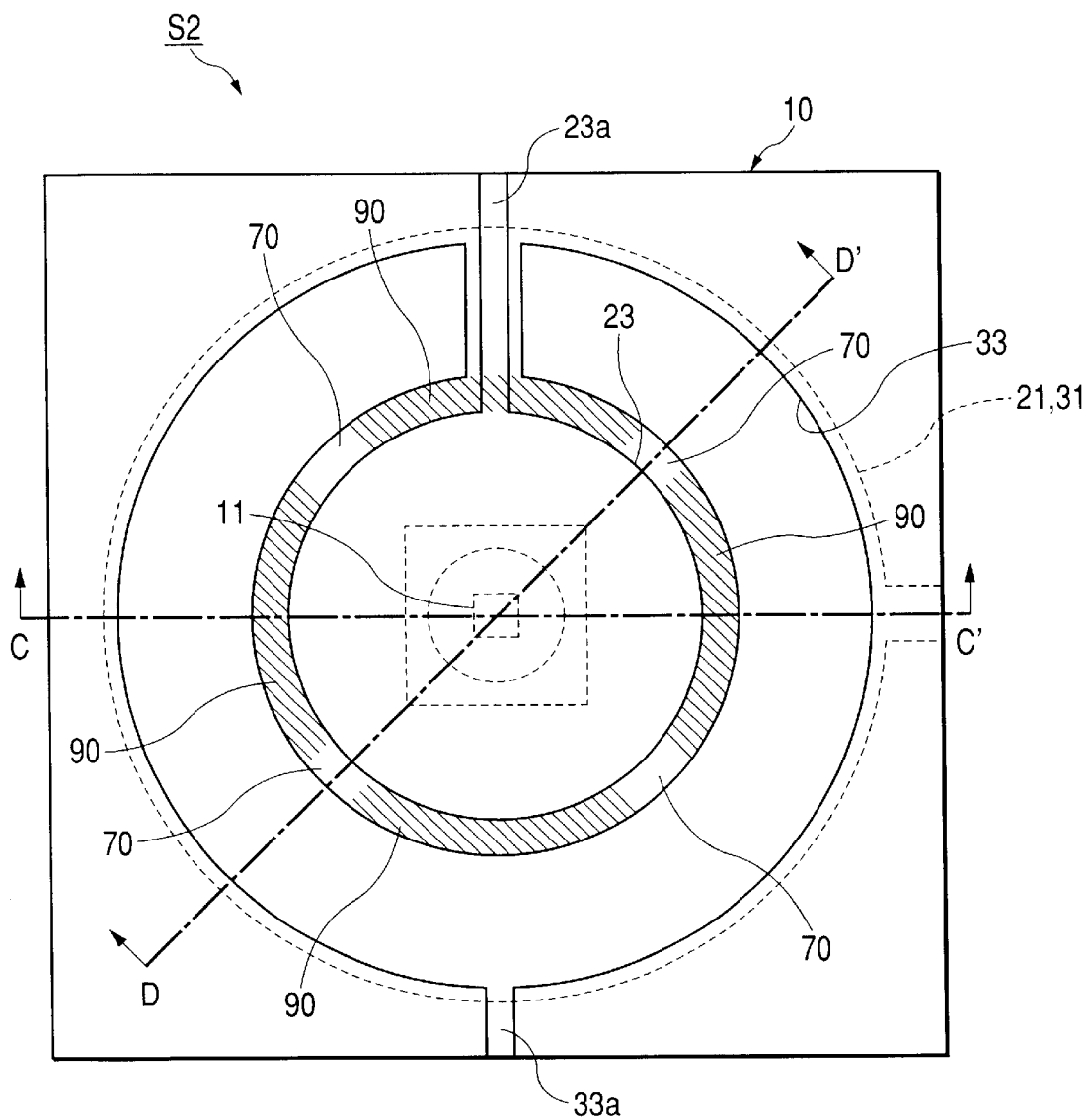
FIG. 9 is a plan view of a capacitive pressure sensor according to a second example of the second embodiment.
Figure 10:
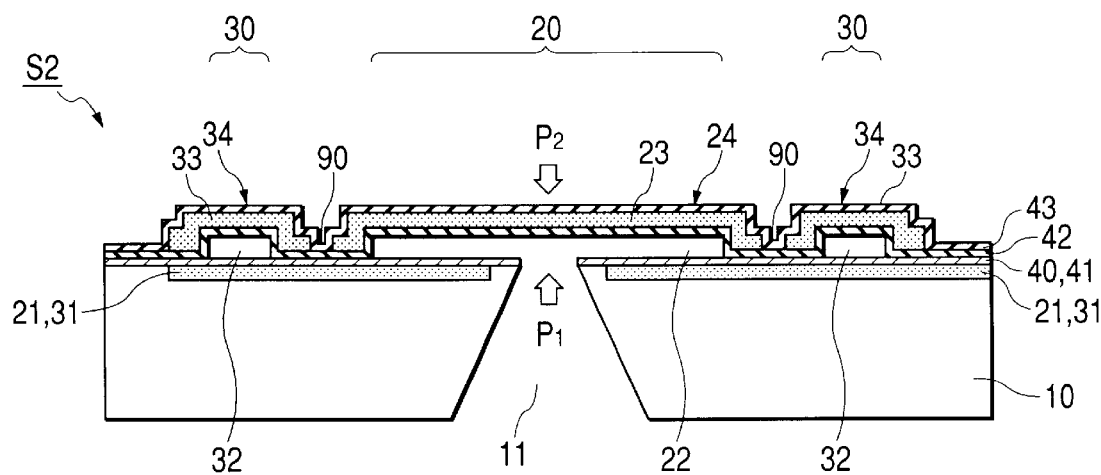
FIG. 10 is a sectional elevation view of the capacitive pressure sensor, taken on line C–C' in FIG. 9.
Figure 11:
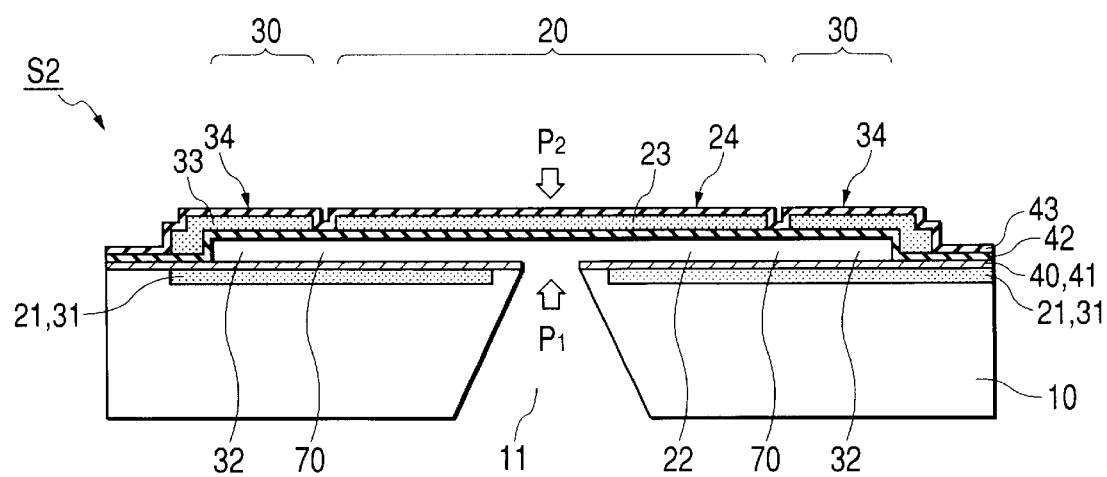
FIG. 11 is a sectional elevation view of the capacitive pressure sensor, taken on line D–D' in FIG. 9.

FIG. 9 shows a second example according to the second embodiment in an outline plan view and mainly shows respective electrodes. FIG. 10 shows a sectional elevation view taken on line C–C' in FIG. 9. FIG. 11 shows a sectional elevation view taken on line D–D' in FIG. 9. In FIG. 9, the first and second lower electrodes 21 and 31, and the opening portion 11 are shown by chain lines.

The second example has a supporting member 90 in addition to the structure of the first example of the second embodiment. The supporting member 90 is provided between the first and second capacitive portions 20 and 30 to support the outer circumference portion of the first upper electrode 23 and the inner circumference portion of the second upper electrode 33 to suppress displacement of the second upper electrode 33. The slant hatching in FIG. 9 represents the position of the supporting member 90.

The supporting member 90, as shown in FIG. 10, supports the outer circumference of the first upper electrode 23 and an inner circumference of the second upper electrode 33 with respect to the first insulation films 40 and 41. The supporting member 90 has communication portions 70 (in FIG. 9, there are four communication portions) to communicate with the first and second cavity spaces 22 and 32.

Moreover, in the second example, the first and second lower electrodes 21 and 31 are combined in a form of a circular ring (shown by a chain line in FIG. 9).

According to the second example, in addition to the effects obtained by the first example, the diaphragm 24 has a higher stiffness than that obtained in the first example because the diaphragm 34 is supported by the supporting member 90. This further makes the sensitivities of the diaphragms 24 and 34 different from each other. In other words, this makes the variation in the second capacitance of the capacitive portion 30 smaller than the first capacitance of the first capacitive portion 20, so that the differences in the capacitances of both first and second capacitive portions 20 and 30 can be obtained at a high efficiency.

Figure 12:
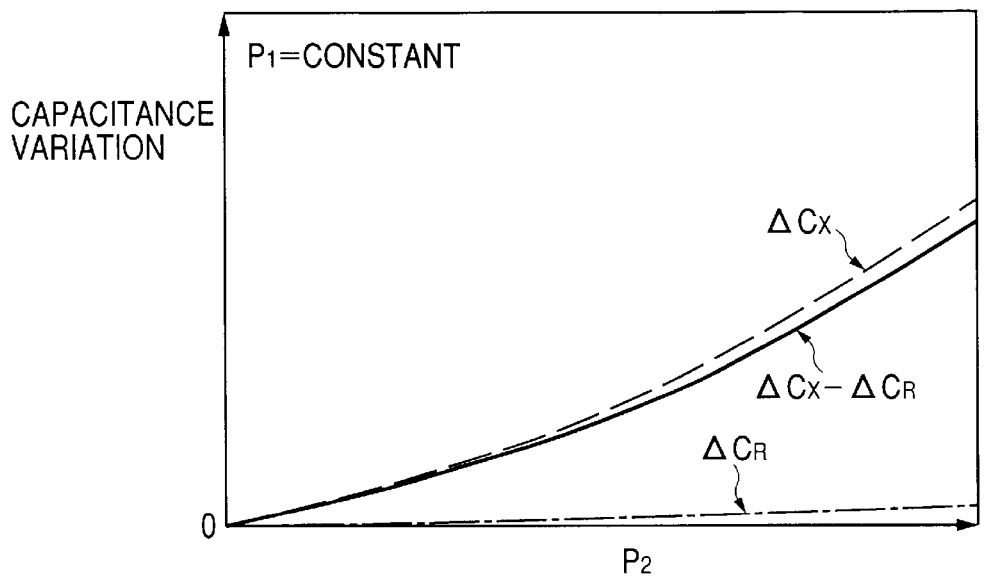
FIG. 12 is a graphical drawing illustrating a relation between the capacitance variation and the pressure in the second example of the second embodiment.

This specific effect in the second embodiment is shown in FIG. 12. FIG. 12 represents the relations between capacitance variations and the pressure P2 in the same manner as FIG. 8. The movable electrode 34 of the second capacitive portion 30 displaces little though the applied pressure increases, so that the second capacitance variation $\Delta C_R$ is substantially zero. Thus, the difference ($\Delta C_x - \Delta C_R$) can be obtained effectively.

The capacitive pressure sensor S2 of the first and second examples can be produced in the similar manner to the first embodiment as follows:

The lower electrode forming process, the first insulation film forming process, the sacrifice layer forming process, the second insulation film forming process, the upper electrode forming process, and the third insulation film forming process are done with modification according to the second embodiment.

Next, instead the through hole forming process, anisotropy etching to silicon is done on the bottom surface of the substrate 10 with a potassium hydroxide solution. Moreover, the first insulation films 40 and 41 are etched with a hydrofluoric solution on the side of the bottom surface of the substrate 10 to form the opening 11 (substrate opening forming process).

Next, using the opening 11 as an inlet of an etchant, the sacrifice layer etching process is done as mentioned above to form the cavity spaces 22 and 32. Next, the electrode pad forming process is done, and if necessary, the protection film forming process is done to form the capacitive pressure sensor S2.

Moreover, the capacitive pressure sensor S2 according to this embodiment is applicable to an absolute pressure sensor. For example, in the first and second examples, the opening is not formed in the substrate 10, but a through hole can be formed at the center of the movable diaphragm 24, and then, the through hole is sealed with the protection film or the like in the same way as the first embodiment.

Thus, respective cavity spaces 22 and 32 are sealed to have a predetermined inner pressure (a possible vacuum provided by a vacuum device) to act as a reference pressure chamber to provide an absolute pressure sensor.

Modifications

In the above-mentioned embodiments, the first capacitive portion 20 is used for measuring a subject pressure and the second capacitive portion 30 is used for diagnostic. However the first capacitive portion 20 can be used for diagnostic, and the second capacitive portion 30 can be used for measuring a subject pressure. Moreover, both first and second capacitive portions 20 and 30 can be used for measuring the subject pressure.

If one of the first and second capacitive portions 20 and 30 is used for measuring a subject pressure. The other can be used as a reference capacitive portion for compensating the output of the one capacitive portion. For example, if it is assumed that the sensor output is compensated by a compensation circuit in accordance with an output of only one capacitive portion, it will be necessary to measure at least two different pressures. On the other hand, in the case of the capacitive pressure sensor according to this invention, the output characteristic can be provided from pressure measurement at one pressure because the sensor has two capacitive portions having different sensitivities. Thus, only once measurement can provide the compensation of the sensor output.

Moreover, in the first embodiment, the movable diaphragm 24 of the first capacitive portion 20 and the movable diaphragm 34 of the second capacitive portion 30 can have different sensitivities though they have the same layer structure because they have different sizes, i.e., different areas. However, with the same size of the diaphragms, difference in sensitivity can be provided by different layer structure. That is, one layer is further formed on the surface of one of diaphragms having the same area size to have different sensitivities.

As mentioned above, the present invention provides a capacitive pressure sensor comprising: the substrate 10; the first capacitive portion 20 including the first lower electrode 21 on the surface of the substrate 10 and the first upper electrode 23 facing the first lower electrode 21 with the first cavity space 22, the first upper electrode 23 being supportable by the substrate 10 to have a first diaphragm structure; the second capacitive portion 30 including the second lower electrode 31 on the surface of the substrate 10 and a second upper electrode 33 facing the second lower electrode 31 with the second cavity space 32, the second upper electrode 33 being supportable by the substrate 10 to have a second diaphragm structure; and the communicating structure 70 for providing fluidic communication between the first and second cavity spaces 22 and 32.

Thus, a trouble in one of the first and second capacitive portions 20 and 30 can be detected by comparing the output of one capacitive portion with the other normal capacitive portion with the comparing circuit 12. Thus, one of the first and second capacitive portions 20 and 30 can be used for reference to provide a diagnostic or compensation operation. In addition, the reference pressure in the first cavity space 22 is equalized to that in the second cavity space 32, so that pressure measurement can be accurately provided.

Regarding diagnostic and compensation, the capacitive pressure sensor further comprises the comparing circuit 12 for this comparison between a first value from the first capacitive portion 20 representing a pressure P applied thereto with a second value from the second capacitive portion 30 representing the pressure P applied thereto. Thus, a diagnostic result can be provided.

Further, the first and second upper electrodes 23 and 33 have first and second areas in parallel to the surface of the substrate, respectively, and the first area is different from the second area. Therefore, the first and second capacitive portions 20 and 30 have different sensitivities (stiffnesses), so that diagnostic or compensation can be provided effectively because once pressure measurement can provide diagnostic or compensation operation.

Moreover, the first capacitive portion 20 has a first layer structure with the first upper and lower electrodes 21 and 23 in a sectional elevation view of the capacitive pressure sensor perpendicular to the surface of the substrate 10, and the second capacitive portion 30 has a second layer structure with the second upper and lower electrodes 31 and 33 in the sectional elevation view, and the first layer structure is substantially the same as the second layer structure. Thus, the first and second capacitive portions 20 and 30 can be produced easily.

Further, the second capacitive portion 30 may be so arranged as to surround the first capacitive portion, wherein the first upper electrode 23, at an outer circumference, is connected to the second upper electrode 33 at an inner circumference, and the first cavity space 22 is connected to the second cavity space 32. Thus, this structure provides miniaturization.

The capacitive pressure sensor may further comprise the supporting member 90 between the first and second upper electrodes 23 and 33 to support the outer circumference of the first upper electrode 23 and the inner circumference of the second upper electrode 33 to suppress position variation of the second upper electrode 33, wherein the communication structure 70 is formed in the supporting member 70. Thus, the stiffness of the second upper electrode 33 can be increased to provide different sensitivities with a compact structure.

What is claimed is:

1. A capacitive pressure sensor comprising:
    a substrate;
    a first capacitive portion including a first lower electrode on a surface of said substrate and a first upper electrode facing said first lower electrode with a first cavity space between said first lower electrode and said first upper electrode, said first upper electrode being supportable by said substrate to define a first diaphragm structure;
    a second capacitive portion including a second lower electrode on said surface of said substrate and a second upper electrode facing said second lower electrode with a second cavity space between said second lower electrode and said second upper electrode, said second upper electrode being supportable by said substrate to define a second diaphragm structure;
    a lower insulation layer on said substrate and an upper insulation layer on said lower insulation layer extending substantially between said first and second capacitive portions; and
    a communicating structure for providing fluid communication between said first and second cavity spaces, wherein said communicating structure comprises a channel having a width in a direction perpendicular to an extending direction of said channel that is smaller than widths of said first and second capacitive portions in said direction, wherein said channel is provided between said lower and upper insulation layers.

2. The capacitive pressure sensor as claimed in claim 1, further comprising comparing means for comparing a first value from said first capacitive portion representing a pressure applied thereto with a second value from said second capacitive portion representing said pressure applied thereto to output a diagnostic result.

3. The capacitive pressure sensor as claimed in claim 1, wherein said first capacitive portion has a first layer structure with said first upper and lower electrodes in a sectional elevation view of said capacitive pressure sensor perpendicular to said surface of said substrate, and said second capacitive portion has a second layer structure with said second upper and lower electrodes in said sectional elevation view, and said first layer structure is substantially the same as said second layer structure, and wherein said first and second upper electrodes have first and second areas in parallel to said surface of said substrate, respectively, and said first area is different from said second area.

4. The capacitive pressure sensor as claimed in claim 1, wherein said second capacitive portion is so arranged as to surround said first capacitive portion, said first upper electrode, at an outer circumference, is connected to said second upper electrode at an inner circumference, and said first cavity space is connected to said second cavity space.

5. A capacitive pressure sensor comprising:

a substrate;

a first capacitive portion including a first lower electrode on a surface of said substrate and a first upper electrode facing said first lower electrode with a first cavity space between said first lower electrode and said first upper electrode, said first upper electrode being supportable by said substrate to define a first diaphragm structure;

a second capacitive portion including a second lower electrode on said surface of said substrate and a second upper electrode facing said second lower electrode with a second cavity space between said second lower electrode and said second upper electrode, said second upper electrode being supportable by said substrate to define a second diaphragm structure; and a communicating structure for providing fluid communication between said first and second cavity spaces, wherein said second capacitive portion is so arranged as to surround said first capacitive portion, said first upper electrode, at an outer circumference, is connected to said second upper electrode at an inner circumference, said first cavity space is connected to said second cavity space, and said capacitive sensor further comprises a supporting member between said first and second upper electrodes to support said outer circumference of said first upper electrode and said inner circumference of said second upper electrode to suppress position variation of the second upper electrode, wherein said communication structure is formed in said supporting member.

6. The capacitive pressure sensor as claimed in claim 1, wherein said first and second cavity spaces have first and second heights, respectively, and said channel has a channel space having a third height, and wherein said third height is smaller than said first and second heights.

7. The capacitive pressure sensor as claimed in claim 1, wherein said first and second upper electrodes have first and second areas, respectively, and said first area is larger than said second area, and wherein said first capacitive portion is for outputting measured pressure and said second capacitive portion is for diagnostic operation.

8. The capacitive pressure sensor as claimed in claim 1, said first and second cavity spaces are substantially circular.

9. The capacitive pressure sensor as claimed in claim 5, further comprising an insulation portion for insulating said first upper electrode from said second upper electrode, wherein said first upper electrode is connected to said second upper electrode through an insulation portion.

* * * * *